United States Patent [19]
Ricks et al.

[11] Patent Number: 5,944,805
[45] Date of Patent: Aug. 31, 1999

[54] SYSTEM AND METHOD FOR TRANSMITTING DATA UPON AN ADDRESS PORTION OF A COMPUTER SYSTEM BUS DURING PERIODS OF MAXIMUM UTILIZATION OF A DATA PORTION OF THE BUS

[75] Inventors: Joe A. Ricks; Andrew W. Steinbach; Michael G. Drake, all of Austin, Tex.

[73] Assignee: Advanced Micro Devices, Inc., Sunnyvale, Calif.

[21] Appl. No.: 08/915,892

[22] Filed: Aug. 21, 1997

[51] Int. Cl.$^6$ ........................................................ G06F 13/14
[52] U.S. Cl. ........................ 710/107; 710/112; 710/120; 710/240; 710/129
[58] Field of Search .................... 395/309, 320, 395/285, 284; 711/130, 137, 141, 158; 710/52

[56] References Cited

U.S. PATENT DOCUMENTS

| | | | |
|---|---|---|---|
| 5,006,982 | 4/1991 | Ebersole et al. | 709/236 |
| 5,303,095 | 4/1994 | Vuong | 360/46 |
| 5,459,852 | 10/1995 | Nakagawa et al. | 711/138 |
| 5,524,216 | 6/1996 | Chan et al. | 395/287 |
| 5,530,933 | 6/1996 | Frink et al. | 711/141 |
| 5,615,382 | 3/1997 | Gavin et al. | 395/800 |
| 5,657,472 | 8/1997 | Van Loo et al. | 711/158 |

OTHER PUBLICATIONS

Bennett, "Breach the performance bottlenecks in today's multiprocessor designs," EDN ACCESS: Design Feature, Jul. 7, 1994, downloaded and printed from www.ednmag.com on Dec. 29, 1998, 10 pages.

*Primary Examiner*—Ayaz R. Sheikh
*Assistant Examiner*—Raymond N Phan
*Attorney, Agent, or Firm*—Conley, Rose & Tayon, PC; B. Noel Kivlin

[57] ABSTRACT

A system and method are presented for transmitting data upon an address portion of a computer system bus during periods of maximum or near-maximum utilization of a data portion of the bus. One embodiment of the computer system includes at least one central processing unit (CPU) and a main memory coupled to a processor bus. The main memory stores data, and the CPU executes instructions stored within the main memory. The processor bus is a split transaction bus. The processor bus is divided into an address bus, a data bus, and a control bus including address, data, and control signal lines, respectively. The CPU and the main memory each include a bus interface, and are coupled to the processor bus via the bus interface. The bus interface includes a transaction queue coupled to an interface unit. The interface unit is coupled to the address, data, and control buses, and performs bus transactions (i.e., read and/or write transactions) upon the processor bus. The split bus transactions are coordinated using tag values generated by the CPU. The transaction queue stores a list of pending data exchange operations. Each interface unit competes for control of the address and data buses. When the transaction queue is not full, the interface unit performs data transfers using the data bus. When the transaction queue is full (e.g., when the data bus is nearing maximum utilization), the interface unit is configured to gain control of the address bus and to transfer data via the address bus.

17 Claims, 4 Drawing Sheets

SYSTEM AND METHOD FOR TRANSMITTING DATA UPON AN ADDRESS PORTION OF A COMPUTER SYSTEM BUS DURING PERIODS OF MAXIMUM UTILIZATION OF A DATA PORTION OF THE BUS

BACKGROUND OF THE INVENTION

1. Field of Invention

This invention relates to computer systems, and more particularly to computer system bus structures used to interconnect system components.

2. Description of Related Art

A typical computer system includes one or more sets of wires (i.e., buses) which serve as shared communication links between system components. The two major advantages of shared buses over direct communication links are versatility and low cost. By defining a standard interconnection scheme for a given bus, new devices may be easily connected to the bus. The cost of the bus is low because it is shared among the number of components connected to the bus.

Each bus has at least one component connected to it which can initiate a transfer of data. Such components are called "bus master" devices. Other devices coupled to the bus and capable only of responding to data transfer requests initiated by bus master devices are called "slave" devices. For example, a typical computer system includes a CPU coupled to a memory system via a bus. The CPU executes instructions stored in the memory system, and initiates transfers of instructions from the memory system as needed. The CPU also transfers data to the memory system for storage as required. The CPU is, by definition, a bus master device. The memory system simply responds to data transfer requests initiated by the CPU and is a slave device. A computer system including multiple CPUs or other components coupled to a common bus and capable of initiating data transfers has multiple bus master devices. In such systems, each bus master device must compete with the other bus master devices for control of the bus when the bus is needed.

A typical computer system bus (i.e., system bus) includes multiple address, data, and control signal lines. Such system buses are typically divided into an address bus including the address signal lines, a data bus including the data signal lines, and a control bus including the control signal lines. Data transfers across the system bus are carried out using bus "transactions". A bus master device (e.g., the CPU) performs a "read" transaction in order to obtain needed data from another system component coupled to the system bus. During the read transaction, the bus master device transmits address signals upon the address bus and control signals indicative of a request for data (i.e., a read transaction) upon the control bus. Upon receiving the address and control signals, the target system component (e.g., the memory system) accesses the requested data. The target component then transmits data signals representing the requested data upon the data bus and control signals which indicate the availability of the data upon the control bus. In many computer systems, the bus master device maintains control of the system bus during the entire period of time between transmission of the address signals and reception of the requested data.

When performing a "write" transaction, the bus master device transmits address signals upon the address bus, data signals representing the data upon the data bus, and control signals indicating a transmission of data (i.e., a write transaction) upon the control bus. Upon receiving the address and control signals, the target system component (e.g., the memory system) stores the data signals. Following simultaneous transmission of address, data, and control signals during a write transaction, the bus master device typically assumes reception of the data by the target component and immediately relinquishes control of the system bus.

In order to make more efficient use of the system bus, several data units (e.g., 8-bit bytes, 16-bit words, etc.) may be transmitted from one system component to another over the bus during a single bus transaction. The data units are typically transmitted one after another in sequence. Such "burst mode" transmission allows more data units to be transmitted over the system bus in a shorter length of time.

Where multiple bus master devices share a common system bus, it is often necessary to limit the amount of time that any one bus master device has control of the system bus. One method of limiting the amount of time a bus master device has control of the system bus is to split read transactions into separate "address" and "data" portions. A bus master device transmits the address and associated control signals during the address portion of a read transaction. Following the address portion, the bus master device relinquishes control of the system bus, allowing other bus master devices to use the system bus while the target component is accessing the requested data. When the target component is ready to transmit the requested data, the target component transmits data signals representing the requested data and associated control signals during the data portion of the read transaction. Such a bus configuration is called a "split transaction" bus.

In a system employing a split transaction bus, each bus master device generates a "tag" value which uniquely identifies the transaction. The tag value is transmitted along with information associated with the transaction (e.g., address or data signals), typically upon signal lines of the control bus. Each system component coupled to the bus typically includes a "transaction queue" used to track outstanding bus transactions. The tag values of outstanding transactions are stored within the transaction queue. The tag value of an outstanding transaction is removed from the transaction queue (i.e., "retired") when the transaction is complete. For write transactions, a system component may retire the associated tag value immediately after the transmission of the associated address, data, and control signals. A bus master device initiating a read transaction may not retire the tag value until the data portion of the read transaction is completed (i.e., until the requested data is received from the target component).

A problem arises when data signals cannot be conveyed upon the data bus at a rate fast enough to satisfy the needs of all bus master devices coupled to the system bus. This often occurs during burst mode data transfers (e.g., cache line fills and frame buffer reads and writes). In such cases, the transaction queues of the bus master devices become full. When a bus master device's transaction queue is full, the bus master device must wait for an outstanding bus transaction to complete (i.e., a tag value to be retired from the transaction queue) before another bus transaction can be initiated. As a result, the address bus experiences periods of nonuse (i.e., is underutilized) while utilization of the data bus is at or near a maximum value.

FIG. 1 is a chart of address and data portions of bus transactions occurring over a split transaction bus versus time. FIG. 1 illustrates the situation where data signals cannot be conveyed upon the data signal lines (i.e., the data bus) of the split transaction bus at a rate fast enough to satisfy the needs of all devices coupled to the split transaction bus. As a result, the devices are not able to initiate as many bus transactions, and the address signal lines (i.e., the address bus) of the split transaction bus experiences periods of nonuse 8 while the data bus is in constant use.

It would be beneficial to have a computer system including a system bus shared by system components wherein during periods of maximum or near-maximum data bus utilization, the underutilized address bus is used to transfer data. During such periods, the desired system bus advantageously exploits the underutilized transmission capability of the address bus in order to increase data transmission efficiency. As a result, the overall performance of the computer system is improved.

SUMMARY OF THE INVENTION

The problems outlined above are in large part solved by a system and method for transmitting data upon an address portion of a computer system bus during periods of maximum or near-maximum utilization of a data portion of the bus. One embodiment of the computer system includes at least one central processing unit (CPU) and a main memory coupled to a processor bus. The main memory is configured to store data, and the CPU executes instructions stored within the main memory. The processor bus is used to transfer data, and includes address, data, and control signal lines. The processor bus is divided into an address bus including the address signal lines, a data bus including the data signal lines, and a control bus including the control signal lines. The CPU and the main memory exchange data over the processor bus via data exchange operations.

Able to initiate data transfers via the processor bus, the CPU is a bus master device. Other bus master devices may also be coupled to the processor bus. The main memory only responds to data transfer requests initiated by bus master devices, and is a slave device. Other slave devices may also be coupled to the processor bus.

The processor bus is operated as a split transaction bus. A read transaction performed upon the processor bus includes separate address and data portions, the address portion preceding the data portion. During a read transaction between the CPU and the main memory, the CPU drives address and control signals upon respective address and control buses during the address portion of the read transaction. Following the address portion, the CPU relinquishes control of the address and control signal lines of the processor bus. When the main memory is ready to transmit the requested data, the main memory drives data signals representing the requested data and associated control signals upon respective data and control buses during the data portion of the read transaction.

Devices coupled to the processor bus includes a bus interface, and is coupled to the processor bus via the bus interface. The bus interface includes a transaction queue coupled to an interface unit. The interface unit is coupled to the address, data, and control buses of the processor bus. The interface unit performs bus transactions (i.e., read and/or write transactions) upon the processor bus. The split bus transactions are coordinated using tag values generated by the CPU. The transaction queue stores a list of pending data exchange operations.

The computer system may also include a bus arbiter coupled to the processor bus which arbitrates control of the address and data buses between the devices coupled to the processor bus. In this case, each bus interface may be connected to the bus arbiter by separate "address bus request", "address bus grant", "data bus request", and "data bus grant" signal lines of the control bus. At the beginning of a bus transaction, the bus interface of a device coupled to the processor bus competes with all other devices for control of the address bus and/or the data bus. In order to gain control of the address bus, the interface unit asserts an "address bus request" signal upon the dedicated address bus request signal line. In response to the address bus request signal, the bus arbiter awards control of the address bus to the bus interface by asserting an "address bus grant" signal upon the dedicated address bus grant signal line. Upon receiving the address bus grant signal, the bus interface assumes control of the address bus.

Each transaction queue produces a "transaction queue full" signal when no more storage locations are available to store tag values of outstanding bus transactions. This typically occurs when utilization of the data bus is at or approaching a maximum value. Each interface unit receives the frill signal produced by the corresponding transaction queue. In one embodiment, each interface unit drives data signals upon: (i) the data bus when the full signal is not asserted (i.e., when the corresponding transaction queue is not full), and (ii) the address bus when the full signal is asserted (i.e., when the corresponding transaction queue is full). In this case, when the full signal is not asserted, the interface unit of a bus interface needing to transmit data asserts the data bus request signal upon the data bus request signal line. The bus arbiter responds to the data bus request signal by asserting the data bus grant signal giving the bus interface control of the data bus. When the full signal is asserted, however, the interface unit asserts the address bus request signal upon the dedicated address bus request signal line. The bus arbiter responds to the address bus request signal by asserting the address bus grant signal giving the bus interface control of the address bus. The bus interface then transmits the data upon the signal lines of the address bus. As a result, the load upon the data bus is reduced. The data transfer capability of the processor bus is improved, as is the performance of the computer system.

In an alternate embodiment, each interface unit drives data signals upon: (i) the data bus when the full signal is not asserted (i.e., when the corresponding transaction queue is not full), and (ii) both the address bus and the data bus when the full signal is asserted (i.e., when the corresponding transaction queue is full). In this case, when the full signal is asserted, the interface unit asserts both the address bus and data bus request signals. When the bus arbiter responds by asserting both the address bus and data bus grant signals, the bus interface assumes control of both the address bus and the data bus. The bus interface treats the signal lines of the address bus and the data bus as one large data bus having a number of signal lines equal to the combined number of signal lines of the address bus and the data bus. The bus interface transmits the data upon the combined signal lines of the address bus and the data bus. As a result, the amount of data transmitted per unit of time is increased, reducing the load upon the data bus. The data transfer capability of the processor bus is again improved, as is the performance of the computer system.

A method of exchanging data between components of a computer system in accordance with the present invention includes providing a system bus adapted for transferring data and a first and second components. The system bus includes address, data, and control signal lines. The system bus is divided into an address bus including the address signal lines, a data bus including the data signal lines, and a control bus including the control signal lines. The first and second components include a transaction queue for storing a list of pending data exchange operations. Each of the first and second components is configured to: (i) transmit data signals upon the data bus when the transaction queue is not full; and (ii) transmit data signals upon the address signal lines of the processor bus when the transaction queue is fill. The first and second components are coupled to the system bus, and an exchange of data is initiated between the first and second components.

BRIEF DESCRIPTION OF THE DRAWINGS

Other objects and advantages of the invention will become apparent upon reading the following detailed description and upon reference to the accompanying drawings in which.

Figure 1:
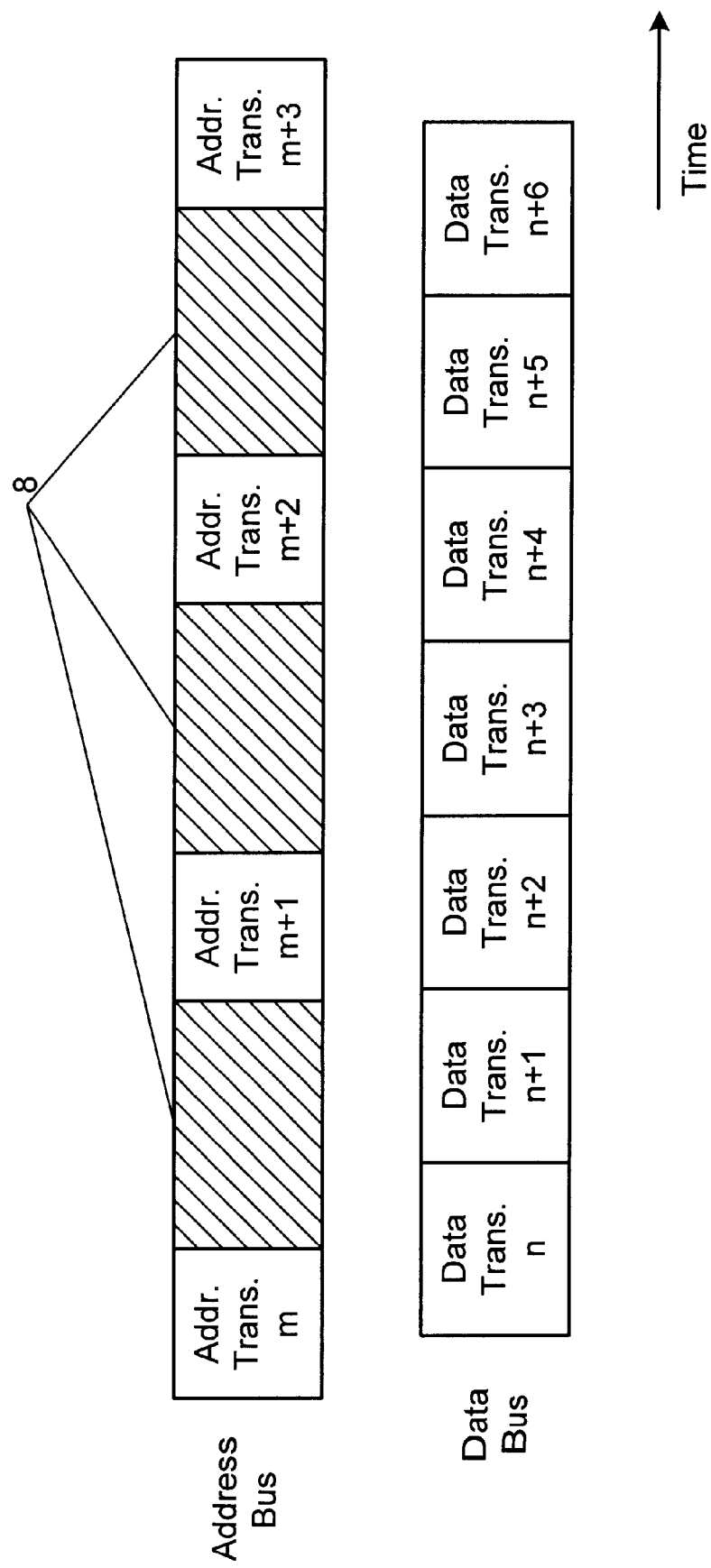
FIG. 1 is a chart of address and data portions of bus transactions occurring over a split transaction bus versus time, wherein data signals cannot be conveyed upon the data signal lines (i.e., the data bus) of the split transaction bus at a rate fast enough to satisfy the needs of all devices coupled to the split transaction bus, and wherein the address signal lines (i.e., the address bus) of the split transaction bus experiences periods of nonuse while the data bus is in constant use.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
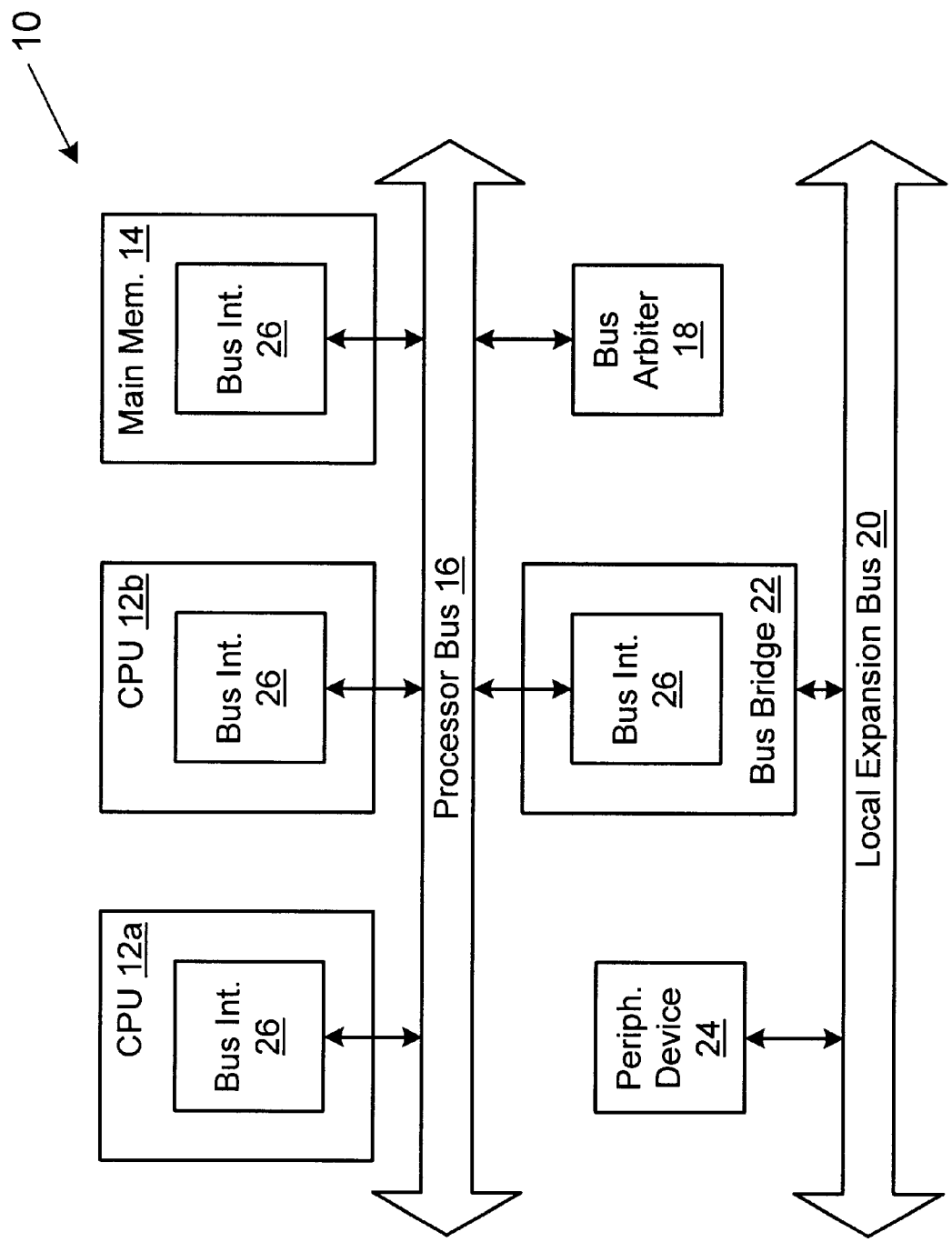
FIG. 2 is a block diagram of a computer system according to one embodiment of the present invention, wherein the computer system includes two central processing units (CPUs), a main memory, a bus bridge, and a bus arbiter coupled to a split transaction processor bus, and wherein the processor bus is divided into an address bus including multiple address signal lines, a data bus including multiple data signal lines, and a control bus including multiple control signal lines, and wherein the two CPUs, the main memory and the bus bridge include a bus interface and are coupled to the processor bus via the bus interface.

Referring now to FIG. 2, a block diagram of a computer system 10 according to one embodiment of the present invention is shown. Computer system 10 includes two central processing units (CPUs) 12a–b and a main memory 14 coupled to a processor bus 16. Main memory 14 is configured to store data. CPUs 12a–b execute instructions stored within main memory 14. Processor bus 16 is adapted for transferring data and includes multiple address, data, and control signal lines. As is typical, processor bus 16 is divided into an address bus including the address signal lines, a data bus including the data signal lines, and a control bus including the control signal lines. Computer system 10 also includes a bus arbiter 18 coupled to processor bus 16 which arbitrates between CPUs 12a–b for control of processor bus 16. Computer system 10 also includes a local expansion bus 20. Local expansion bus 20 may be, for example, a peripheral component interconnect (PCI) bus or a VESA (Video Electronics Standards Association) VL bus. A bus bridge 22 couples local expansion bus 20 to processor bus 16. A representative peripheral device 24 is coupled to local expansion bus 20. Peripheral device 24 may be, for example, a video display device or a disk drive unit.

Processor bus 16 is operated as a split transaction bus. CPUs 12a–b initiate transfers of instructions from main memory 14 as needed, and transfer data to main memory 14 for storage as required. Bus bridge 22 also has the capability of transferring data to and from main memory 14. Able to initiate data transfers via processor bus 16, CPUs 12a–b and bus bridge 22 are bus master devices. Main memory 14 only responds to data transfer requests initiated by bus master devices, and is a slave device.

A read transaction performed upon processor bus 16 includes an address portion followed by a data portion. During a read transaction between a bus master device (e.g., CPU 12a) and a slave device (e.g., main memory 14), the bus master device drives address and control signals upon respective address and control buses during the address portion. Following the address portion, the bus master device relinquishes control of the address and control signal lines of processor bus 16, allowing other bus master devices to use processor bus 16 while the slave device is accessing the requested data. After the slave device has accessed the requested data, the slave device transmits data signals representing the requested data and associated control signals upon respective data and control buses during the data portion of the read transaction.

Figure 3:
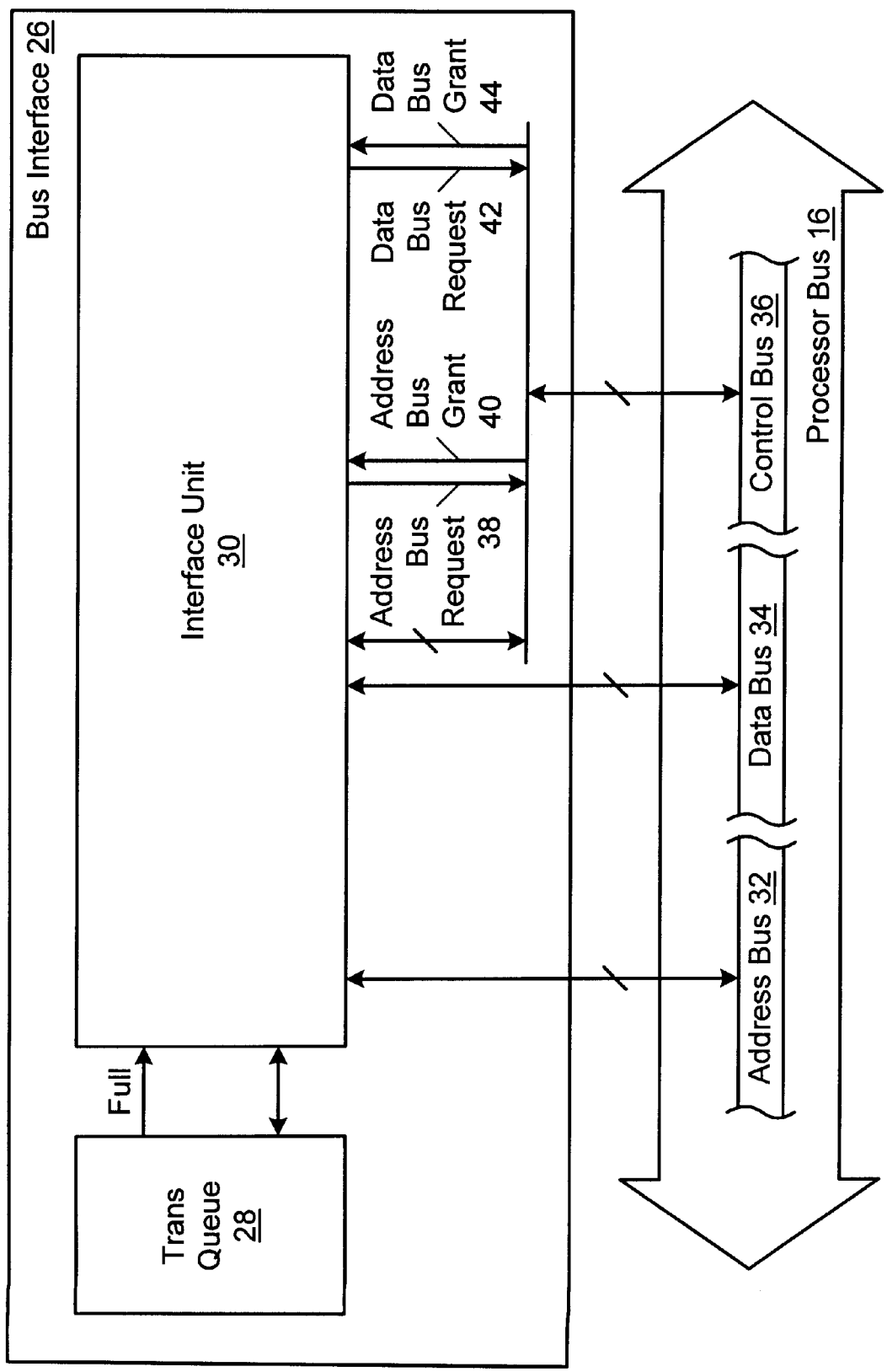
FIG. 3 is a block diagram of one embodiment of each bus interface of FIG. 2, wherein the bus interface includes a transaction queue coupled to an interface unit, and wherein the interface unit is coupled to the address, data, and control buses of the processor bus, and wherein when the transaction queue is full, the interface unit is configured to gain control of the address bus and to transfer data via the address bus.

CPUs 12a–b, main memory 14, and bus bridge 22 each include a bus interface 26 and are coupled to split transaction processor bus 16 via the corresponding bus interface 26. FIG. 3 is a block diagram of one embodiment of bus interface 26. Bus interface 26 includes a transaction queue 28 coupled to an interface unit 30. Interface unit 30 is coupled to address bus 32, data bus 34, and control bus 36 of processor bus 16, and performs bus transactions (i.e., read and/or write transactions) upon processor bus 16. During the address portion of a read transaction initiated by bus interface 26 of a bus master device, the interface unit 30 of the bus interface 26: (i) generates a tag value which uniquely identifies the bus transaction, (ii) drives the tag value upon signal lines of control bus 36, and (iii) provides the tag value to the corresponding transaction queue 28. The bus interface 26 of the target component saves the tag value while accessing the requested data. During the data portion of the read transaction, the bus interface 26 of the target component drives the tag value upon signal lines of control bus 36, informing the bus interface 26 of the bus master device that the requested data is being provided.

Transaction queue 28 includes a number of storage locations for storing tag values of outstanding (i.e., incomplete)

bus transactions. Transaction queue 28 removes the tag value associated with an outstanding transaction from the transaction queue (i.e., retires the tag value) when the corresponding bus transaction is completed. In the case of a write transaction initiated by the interface unit 30 of a bus interface 26, the corresponding transaction queue 28 may retire the associated tag value immediately after interface unit 30 drives the associated address, data, and control signals upon the signal lines of processor bus 16. In the case of a read transaction initiated by the interface unit 30 of a bus interface 26, the corresponding transaction queue 28 retains the tag value until the data portion is completed (i.e., until the requested data is received from the target component during the data portion of the read transaction).

Each bus interface 26 is connected to bus arbiter 18 by an "address bus request" signal line 38, an "address bus grant" signal line 40, a "data bus request" signal line 42, and a "data bus grant" signal line 44 of control bus 36. During a bus transaction, the bus interface 26 of a device coupled to processor bus 16 competes with all other bus master devices for control of address bus 32 and/or data bus 34. In order to gain control of address bus 32, the interface unit 30 of a bus interface 26 asserts an "address bus request" signal upon the dedicated address bus request signal line 38. The address bus request signal is received by bus arbiter 18. In response to the address bus request signal, bus arbiter 18 awards control of address bus 32 to the bus interface 26 by asserting an "address bus grant" signal upon the dedicated address bus grant signal line 40. Upon receiving the address bus grant signal, the bus interface 26 assumes control of address bus 32.

In order to gain control of data bus 34, the interface unit 30 of a bus interface 26 asserts a "data bus request" signal upon the dedicated data bus request signal line 42. The data bus request signal is received by bus arbiter 18. In response to the data bus request signal, bus arbiter 18 awards control of data bus 34 to the bus interface 26 by asserting a "data bus grant" signal upon the dedicated data bus grant signal line 44. Upon receiving the data bus grant signal, the bus interface 26 assumes control of data bus 34.

The number of storage locations within each transaction queue 28 is fixed. During periods of maximum or near-maximum utilization of data bus 34 (e.g., burst mode data transfers), the number of outstanding bus transactions increases, and the transaction queues 28 of devices coupled to processor bus 16 quickly become full. At the same time, address bus 32 experiences periods of nonuse (i.e., is underutilized). In order to facilitate the use of address bus 32 for the transmission of data, each transaction queue 28 produces a "transaction queue full" signal when no more storage locations are available to store tag values of outstanding bus transactions.

Each interface unit 30 receives the full signal produced by the corresponding transaction queue 28. In one embodiment, each interface unit 30 drives data signals upon: (i) data bus 34 of processor bus 16 when the full signal is not asserted (i.e., when the corresponding transaction queue 28 is not full), and (ii) address bus 32 of processor bus 16 when the full signal is asserted (i.e., when the corresponding transaction queue 28 is full). In this case, when the full signal is not asserted, the interface unit 30 of a bus interface 26 needing to transmit data asserts the data bus request signal upon the data bus request signal line 42. Bus arbiter 18 responds to the data bus request signal by asserting the data bus grant signal giving the bus interface 26 control of data bus 34. When the full signal is asserted, however, the interface unit 30 asserts the address bus request signal upon the dedicated address bus request signal line 38. Bus arbiter 18 responds to the address bus request signal by asserting the address bus grant signal giving the bus interface 26 control of address bus 32. The bus interface then transmits the data upon the signal lines of address bus 32. As a result, the load upon data bus 34 is reduced. The data transfer capability of processor bus 16 is improved, as is the performance of computer system 10.

In an alternate embodiment, each interface unit 30 drives data signals upon: (i) data bus 34 of processor bus 16 when the full signal is not asserted (i.e., when the corresponding transaction queue 28 is not full), and (ii) both address bus 32 and data bus 34 of processor bus 16 when the full signal is asserted (i.e., when the corresponding transaction queue 28 is full). In this case, when the full signal is asserted, the interface unit 30 asserts both the address bus and data bus request signals. When bus arbiter 18 responds by asserting both the address bus and data bus grant signals, bus interface 26 assumes control of both address bus 32 and data bus 34. Bus interface 26 treats the signal lines of address bus 32 and data bus 34 as one large data bus having a number of signal lines equal to the combined number of signal lines of address bus 32 and data bus 34. The bus interface transmits the data upon the combined signal lines of address bus 32 and data bus 34. As a result, the amount of data transmitted per unit of time is increased, reducing the load upon data bus 34. The data transfer capability of processor bus 16 is again improved, as is the performance of computer system 10.

Figure 4:
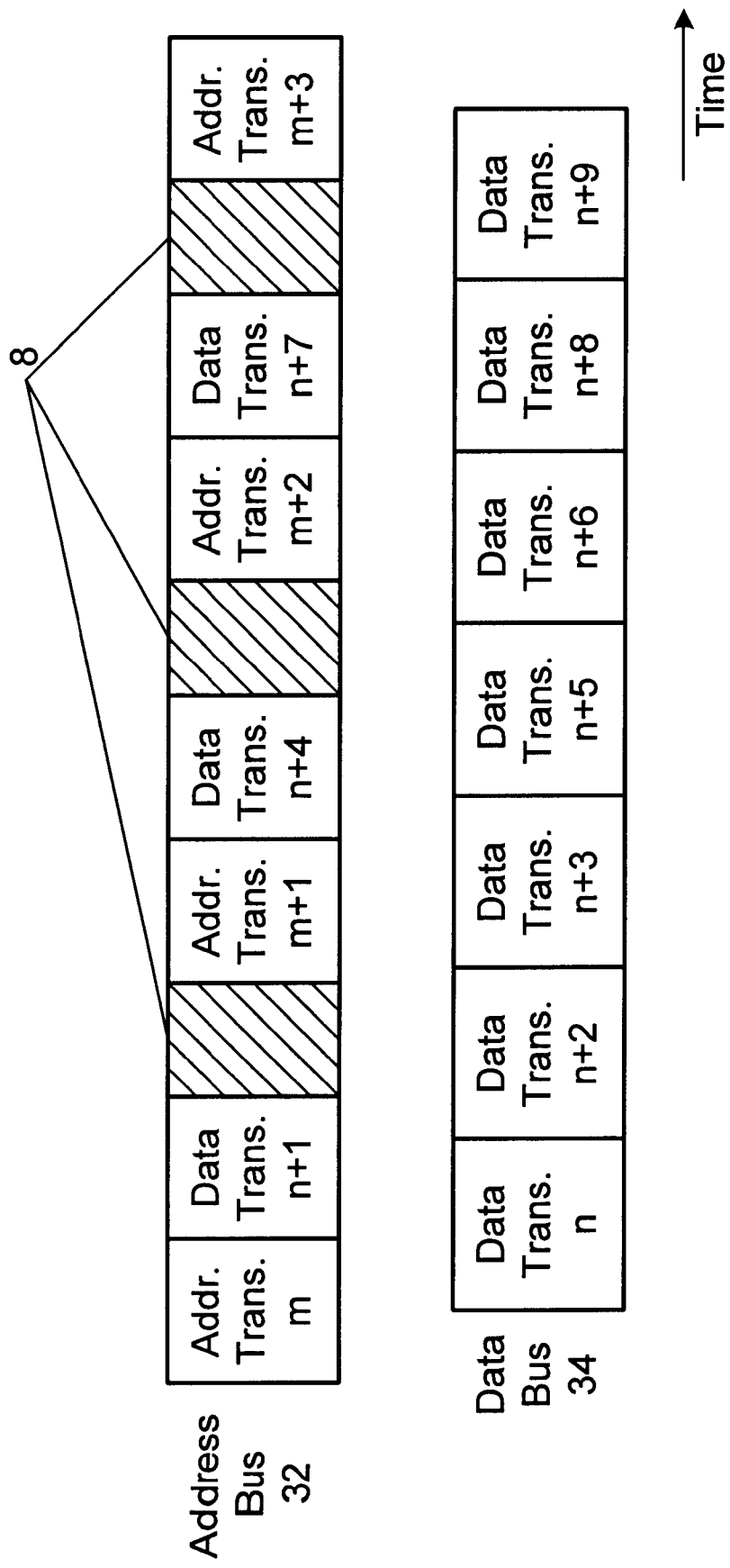
FIG. 4 is an exemplary chart of address and data portions of bus transactions occurring over the processor bus of the computer system of FIG. 2 versus time and according to the present invention, wherein data is transferred upon the address bus when the data bus is in constant use and during periods of nonuse of the address bus, and wherein the periods of nonuse of the address bus are thereby reduced and the rate at which data is transferred within the computer system is increased.

FIG. 4 is an exemplary chart of address and data portions of bus transactions occurring over processor bus 16 of computer system 10 versus time and according to the present invention. As data bus 34 is in constant use, transaction queues 28 of bus interface units 26 coupled to processor bus 16 quickly become full. When transaction queues 28 become full, the corresponding interface units 26 compete for access to address bus 32. Gaining access to address bus 32, the interface units 26 transfer data via address bus 32. As a result, the periods of nonuse 8 of address bus 32 are reduced, and the rate at which data is transferred within computer system 10 is increased.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor bus adapted for transferring data, wherein the processor bus includes separate address, data, and control signal lines;
   a CPU coupled to the processor bus; and
   a main memory coupled to the processor bus and configured to store data;
   wherein the CPU and the main memory are configured to exchange data over the processor bus via data exchange operations, and wherein the CPU and the main memory each include a bus interface having a transaction queue for storing a list of pending data exchange operations, and wherein each bus interface is configured to transmit data upon the data signal lines of the processor bus when the transaction queue is not full, and wherein each bus interface is configured to transmit data upon the address signal lines of the processor bus when the transaction queue is full.

2. The computer system as recited in claim 1, wherein when the CPU obtains data from the main memory during a read transaction comprising an address portion followed by a data portion.

3. The computer system as recited in claim 2, wherein the CPU drives address signals upon the address signal lines of the processor bus during the address portion.

4. The computer system as recited in claim 2, wherein during the data portion, the main memory:
   drives data signals upon the data signal lines of the processor bus when the transaction queue of the main memory is not full; and
   drives data signals upon the address signal lines of the processor bus when the transaction queue of the main memory is full.

5. The computer system as recited in claim 2, wherein the transaction queue of each bus interface includes a number of storage locations for storing tag values which uniquely identify pending data exchange operations.

6. The computer system as recited in claim 2, wherein each bus interface is configured to:
   add a tag value uniquely identifying the pending data exchange operation to the transaction queue during the address portion; and
   remove the tag value from the transaction queue during the data portion.

7. The computer system a s recited in claim 2, wherein each bus interface further comprises an interface unit coupled between the processor bus and the transaction queue, wherein the interface unit is coupled to receive a transaction queue full signal from the transaction queue, and wherein the transaction queue asserts the transaction queue full signal when the transaction queue is full, and wherein the interface unit is configured to:
   drive data upon the data signal lines of the processor bus when the transaction queue full signal is not asserted; and
   drive data upon the address signal lines of the processor bus when the transaction queue full signal is asserted.

8. A computer system comprising:
   a processor bus adapted for transferring data, wherein the processor bus includes separate address, data, and control signal lines, and wherein the processor bus is divided into:
      an address bus comprising the address signal lines;
      a data bus comprising the data signal lines; and
      a control bus comprising the control signal lines;
   a CPU coupled to the processor bus;
   a main memory coupled to the processor bus and configured to store data; and
   a bus arbiter coupled to the processor bus for arbitrating control of the address and data buses between the CPU and the main memory;
      wherein the CPU and the main memory exchange data over the processor bus via data exchange operations, and wherein the CPU and the main memory each include a bus interface having a transaction queue for storing a list of pending data exchange operations, and wherein each bus interface is configured to produce an address bus request signal and a data bus request signal, and wherein each bus interface is configured to receive an address bus grant signal and a data bus grant signal from the bus arbiter, and wherein each bus interface is configured to:
      assert the data bus request signal upon a signal line of the control bus when the transaction queue is not full;
      assert the address bus request signal upon a signal line of the control bus when the transaction queue is full;
      drive data signals upon the data bus in response to an asserted data bus grant signal; and
      drive data signals upon the address bus in response to an asserted address bus grant signal.

9. The computer system as recited in claim 8, wherein the bus arbiter asserts the data bus grant signal in response to the data bus request signal.

10. The computer system as recited in claim 8, wherein the bus arbiter asserts the address bus grant signal in response to the address bus request signal.

11. The computer system as recited in claim 8, wherein when the CPU obtains data from the main memory during a read transaction comprising an address portion followed by a data portion.

12. The computer system as recited in claim 11, wherein the CPU drives address signals upon the address bus during the address portion.

13. The computer system as recited in claim 11, wherein during the data portion, the main memory:
   drives data signals upon the data bus when the transaction queue of the main memory is not full; and
   drives data signals upon the address bus when the transaction queue of the main memory is full.

14. The computer system as recited in claim 11, wherein the transaction queue of each bus interface includes a number of storage locations for storing tag values which uniquely identify pending data exchange operations.

15. The computer system as recited in claim 11, wherein each bus interface:
   adds a tag value uniquely identifying the pending data exchange operation to the transaction queue during the address portion; and
   removes the tag value from the transaction queue during the data portion.

16. The computer system a s recited in claim 11, wherein each bus interface further comprises an interface unit coupled between the processor bus and the transaction queue, wherein the interface unit is coupled to receive a transaction queue fall signal from the transaction queue and the address and data bus grant signals from the bus arbiter, and wherein the transaction queue asserts the transaction queue full signal when the transaction queue is full, and wherein the interface unit is configured to:
   assert the data bus request signal upon a signal line of the control bus when the transaction queue full signal is not asserted;
   assert the address bus request signal upon a signal line of the control bus when the transaction queue full signal is asserted;
   drive data signals upon the data bus when the data bus grant signal is asserted; and
   drive data signals upon the address bus when the address bus grant signal is asserted.

17. A method of exchanging data between components of a computer system, comprising:
   providing a system bus adapted for transferring data, wherein the system bus includes separate address, data, and control signal lines, and wherein the system bus is divided into:
      an address bus comprising the address signal lines;
      a data bus comprising the data signal lines; and
      a control bus comprising the control signal lines;
   providing a first and second components, wherein each of the first and second components includes a transaction queue for storing a list of pending data exchange operations, and wherein each of the first and second components is configured to:

transmit data signals upon the data bus when the transaction queue is not full; and transmit data signals upon the address signal lines of the processor bus when the transaction queue is full;

coupling the first and second components to the system bus; and initiating an exchange of data between the first and second components.

\* \* \* \* \*